United States Patent
Kraine, Jr. et al.

(10) Patent No.: US 6,854,917 B2
(45) Date of Patent: Feb. 15, 2005

(54) LOW-TORQUE PIVOT BUSHING

(75) Inventors: Edward M. Kraine, Jr., Milan, OH (US); Joseph F. Cerri, III, Norwalk, OH (US); Kurt Stoll, Huron, OH (US)

(73) Assignee: The Pullman Company, Milan, OH (US)

( * ) Notice: Subject to any disclaimer, the term of this patent is extended or adjusted under 35 U.S.C. 154(b) by 35 days.

(21) Appl. No.: 10/074,944

(22) Filed: Feb. 12, 2002

(65) Prior Publication Data

US 2002/0111219 A1 Aug. 15, 2002

Related U.S. Application Data

(60) Provisional application No. 60/268,336, filed on Feb. 12, 2001.

(51) Int. Cl.[7] ............................... F16C 11/08
(52) U.S. Cl. ................. 403/120; 403/133; 280/124.127
(58) Field of Search .............................. 267/141.2, 279, 267/281, 141, 153, 220; 280/124.125, 124.127; 384/222, 296; 403/119, 226, 120, 133

(56) References Cited

U.S. PATENT DOCUMENTS

| | | | | |
|---|---|---|---|---|
| 2,273,869 A | * | 2/1942 | Julien ........................ 267/153 |
| 2,553,689 A | * | 5/1951 | Tuck et al. ............. 403/120 X |
| 2,846,251 A | * | 8/1958 | Herbenar ................ 403/133 X |
| 3,011,811 A | * | 12/1961 | Haller |
| 3,171,699 A | | 3/1965 | Maxey |
| 3,181,850 A | * | 5/1965 | Bajer .......................... 267/153 |
| 3,218,383 A | * | 11/1965 | White |
| 3,219,305 A | * | 11/1965 | Chartet .................. 267/153 X |
| 3,235,244 A | * | 2/1966 | Hein .......................... 267/153 |
| 3,239,286 A | | 3/1966 | Harrison |
| 3,347,576 A | * | 10/1967 | Templeton ............... 403/133 X |
| 3,368,697 A | * | 2/1968 | Carlson .................. 267/153 X |
| 3,369,802 A | * | 2/1968 | Wallace et al. ............. 267/153 |
| 3,408,124 A | * | 10/1968 | Melton et al. .......... 403/133 X |
| 3,574,369 A | * | 4/1971 | Andrew .................. 403/133 X |
| 3,801,209 A | | 4/1974 | Matsuoka |
| 4,615,538 A | | 10/1986 | Solleder |
| 4,721,325 A | * | 1/1988 | Mackovjak et al. |
| 4,762,310 A | | 8/1988 | Krajewski et al. |
| 5,058,867 A | * | 10/1991 | Hadano et al. ......... 403/226 X |
| 5,219,231 A | * | 6/1993 | Sheedy ................... 384/296 X |
| 5,540,420 A | * | 7/1996 | Luzsicza |
| 5,607,249 A | * | 3/1997 | Maughan ................ 403/120 X |
| 5,746,673 A | * | 5/1998 | Polster et al. ............ 384/222 X |
| 5,820,115 A | * | 10/1998 | Stevenson et al. ...... 403/226 X |
| 5,938,220 A | | 8/1999 | Torneld |
| 6,170,812 B1 | | 1/2001 | Nicoles |

* cited by examiner

*Primary Examiner*—Greg Binda
(74) *Attorney, Agent, or Firm*—Harness, Dickey & Pierce, PLC

(57) ABSTRACT

A pivot has a low friction rotational property by allowing the elastomeric bushing to rotate with respect to the inner metal. A low friction material can be incorporated between these two components to facilitate the rotation, if desired. The elastomeric bushing helps to isolate the pivot joint and prevent the transmission of vibrations. In one embodiment, the elastomeric bushing is also allowed to pivot about an axis generally perpendicular to its axis of rotation.

6 Claims, 2 Drawing Sheets

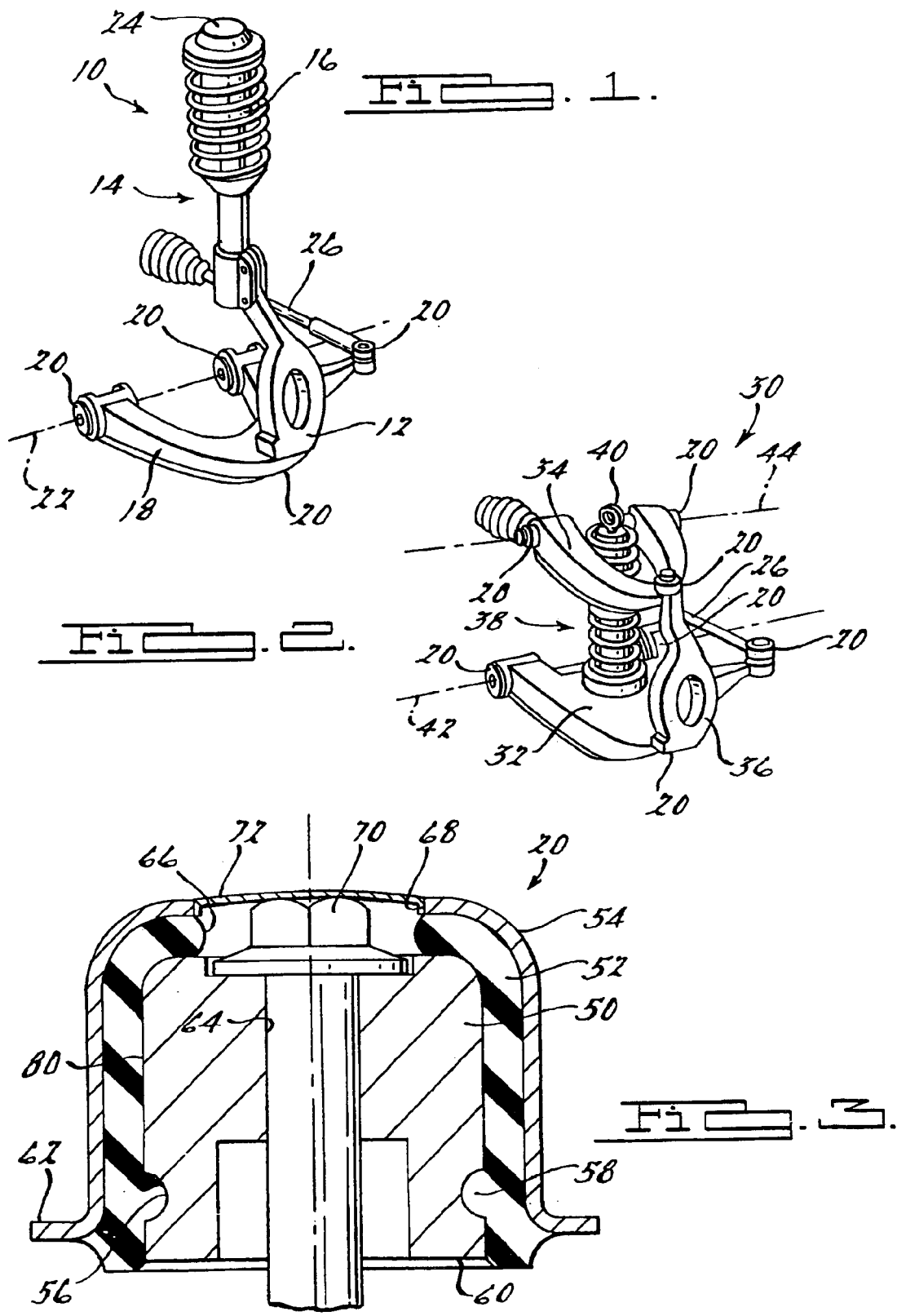

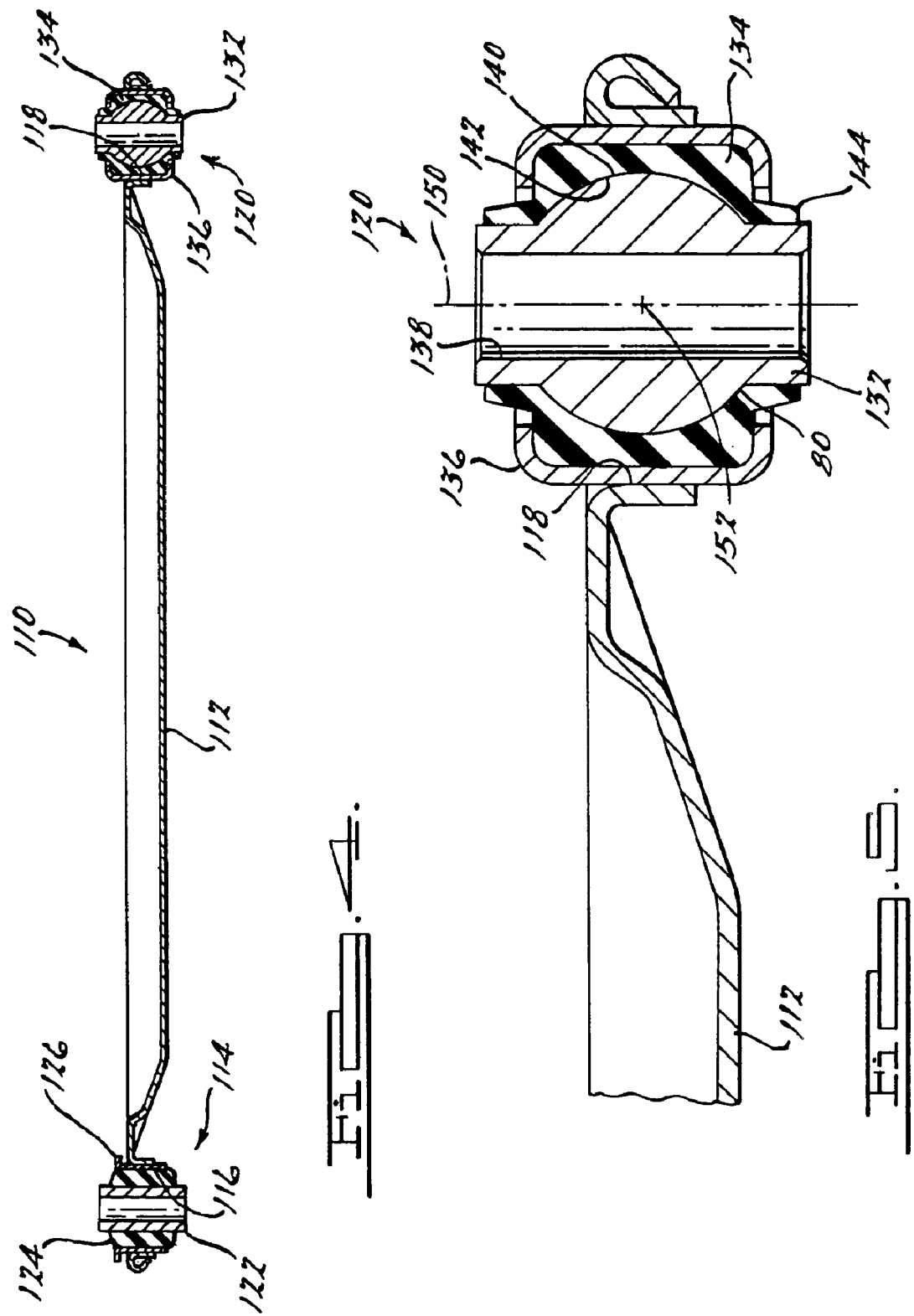

LOW-TORQUE PIVOT BUSHING

REFERENCE TO RELATED APPLICATIONS

This application claims priority to provisional application 60/268,336 filed Feb. 12, 2001.

FIELD OF THE INVENTION

The present invention relates to suspension pivot joints. More particularly, the present invention relates to an elastomeric bushing which allows articulation through flexing of the elastomeric material but also allows pivoting or rotation through sliding of the elastomeric material.

BACKGROUND OF THE INVENTION

Automobiles and other vehicles normally incorporate suspension systems designed to absorb road shock and other vibrations. Many vehicles are provided with independent suspensions located at each wheel. These suspensions are designed to independently minimize the effect of shock loading on each of the wheels.

Suspension systems commonly employ stabilizer bars which interconnect independent suspensions on opposite wheels, lower control arms, upper control arms or strut assemblies, steering linkage and steering knuckles which are typically interconnected to each other through pivot joints such as ball joint assemblies.

Conventional ball joint assemblies comprise a ball stud seated in a socket. In a suspension link, each end of the link incorporates a socket, and a ball is seated in each socket. The stud, which extends from the ball of the ball joint assembly, is connected to one of the wheel assembly components. Ball joint assemblies allow articulation of the joined suspension components in both an angular and rotational direction through sliding of the joint components. The articulation due to sliding of the joint components offers low-torque rotation, but these designs do not offer shock isolation, since all of the components are typically made from rigid materials such as metal and/or hard plastic.

Another design for the pivot joints is an elastomeric bushing. The elastomeric bushing can be mechanically bonded, it can be chemically bonded during molding or it can be chemically bonded after molding. The elastomeric bushing allows articulation of the suspension components in both an angular and rotational direction through flexing of the elastomeric material. Elastomeric bushings offer excellent shock isolation but they have limited rotational capability because they rely on the flexing of the elastomeric material during rotation. The flexing of the elastomeric material adds a considerate amount of parasitic torque to the pivoting of the suspension and thus leads to a degraded ride performance. In addition, the parasitic torque can complicate the initial assembly of the suspension system.

The continued design for pivot joints includes the development of joint assemblies that offer the advantage of shock isolation but also provide the advantage of low-torque rotation.

SUMMARY OF THE INVENTION

The present invention provides the art with a pivot joint which offers the isolation characteristics of an elastomeric bushing as well as the free rotation (low-torque) properties of a ball joint assembly. The pivot joint of the present invention provides for high articulation for improved ride and when used as a suspension pivot it provides for free rotation which enables convenient vehicle assembly. The present invention provides these advantages in an efficient package that can also include captivation, sealing and compression rate tunability.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 1 is a side view of a typical MacPherson strut suspension system incorporating the unique pivot joint in accordance with the present invention;

FIG. 2 is a side view of a typical wishbone suspension system incorporating the unique pivot joint in accordance with the present invention;

FIG. 3 is a vertical cross-sectional view of the pivot joint shown in FIGS. 1 and 2;

FIG. 4 is a vertical cross-sectional view of a pivot joint incorporated into a sway bar link in accordance with another embodiment of the present invention; and FIG. 5 is an enlarged view of the pivot joint illustrated in FIG. 4.

DETAILED DESCRIPTION OF THE PREFERRED EMBODIMENTS

The following description of the preferred embodiment(s) is merely exemplary in nature and is in no way intended to limit the invention, its application, or uses.

There is shown in FIG. 1 a MacPherson strut suspension system which incorporates the unique pivot joint in accordance with the present invention and which is designated generally by the reference numeral 10. MacPherson strut suspension system 10 comprises a steering knuckle 12, a strut 14 having a shock absorber 16, a lower control arm 18 and a pivot joint 20. During suspension movements of suspension system 10, lower control arm 18 pivots about an axis 22 and strut 14 pivots about a point 24 located along the axis of shock absorber 16. The pivoting movement of lower control arm 18 causes pivot joint 20 to angulate or pivot with respect to a generally vertical axis to compensate for the angular differences between lower control arm 18 and steering knuckle 12. During a steering maneuver of suspension system 10, steering knuckle 12 rotates or pivots with respect to lower control arm 18. The rotating or pivoting movement of steering knuckle 12 with respect to lower control arm 18 causes rotation of pivot joint 20 around the generally vertical axis to compensate for the rotating or pivoting of steering knuckle 12. Thus, pivot joint 20 must accommodate both the angular movement with respect to the vertical axis as well as the rotational movement of steering knuckle 12 with respect to lower control arm 1B. FIG. 1 also illustrates a steering linkage 26 which incorporates a second pivot joint 20.

FIG. 1 also illustrates pivot joint 20 being located at the two pivot points along axis 22 of lower control arm 18. In this position, suspension movement of suspension system 10 causes rotation of lower control arm 18 and thus the rotation of pivot joints 20. Any fore and aft impact loading, brake wading or the like to lower control arm 18 are resisted by the pivoting of pivot joints 20. In the preferred embodiment, outer housing 54 is attached to lower control arm 18 and bolt 70 or its equivalent is secured to or is a part of a lower control rod (not shown) which extends along axis 22 between the two pivot joints 20. Also, each pivot joint 20 can be secured to a separate portion of the vehicle by bolt 70.

Referring now to FIG. 2, a wishbone suspension system 30 is illustrated. Wishbone suspension system 30 comprises a lower control arm 32, an upper control arm 34, a steering knuckle 36, a spring assembly 38, a shock absorber 40, a lower pivot joint 20 and an upper pivot joint 20. During suspension movements of suspension system 30, lower control arm 32 pivots about an axis 42 and upper control arm 34 pivots about an axis 44. The pivoting movement of lower control arm 32 causes lower pivot joint 20 to angulate or pivot with respect to a generally vertical axis to compensate for the angular differences between lower control arm 32 and steering knuckle 36. In a similar manner, the pivoting movement of upper control arm 34 causes upper pivot joint 20 to angulate or pivot with respect to the generally vertical axis to compensate for the angular differences between upper control arm 34 and steering knuckle 36. During a steering maneuver of suspension system 30, steering knuckle 12 rotates or pivots with respect to lower control arm 32 and also rotates or pivots with respect to upper control arm 34. The rotating or pivoting movement of steering knuckle 36 with respect to lower control arm 32 causes rotation of lower pivot joint 20 around the generally vertical axis to compensate for the rotating or pivoting of steering knuckle 36. In a similar manner, the rotating or pivoting movement of steering knuckle 36 with respect to upper control arm 34 causes rotation of upper pivot joint 20 around the generally vertical axis to compensate for the rotating or pivoting of steering knuckle 36. Thus, both lower pivot joint 20 and upper pivot joint 20 must accommodate both the angular movement with respect to the vehicle axis as well as the rotational movement around the vertical axis of steering knuckle 36 with respect to lower control arm 32 and upper control arm 34, respectively. FIG. 2 also illustrates steering linkage 26 which incorporates another pivot joint 20.

FIG. 2 also illustrates pivot joint 20 being located at the two pivot points along axis 42 of lower control arm 32 and being located at the two pivot points along axis 44 of upper control arm 34. In these positions, suspension movement of suspension 30 causes rotation of both lower control arm 32 and upper control arm 34 and thus the rotation of pivot joints 20. Any fore and aft impact loading, brake loading or the like to lower control arm 32 and/or upper control arm 34 are resisted by the pivoting of pivot joints 20. In the preferred embodiment, outer housing 54 is attached to lower control arm 32 or upper control arm 34 and bolt 70 or its equivalent is secured to or is a part of a lower or upper control rod (not shown) which extends along axis 42 or 44, respectively, between the two pivot joints 20. Also, each pivot joint 20 can be secured to a separate portion of the vehicle by bolt 70.

Referring now to FIG. 3, pivot joint 20 is illustrated in greater detail. Pivot joint 20 is shown in FIG. 1 as a lower pivot joint, as a steering pivot joint and as a control arm pivot joint; and in FIG. 2 as a lower and an upper pivot joint, as a steering pivot joint and as a control arm pivot joint. It is within the scope of the present invention to utilize pivot joint 20 in these applications or in other applications requiring the angulation and/or rotation of pivot joint 20.

Referring now to FIG. 3, pivot joint 20 comprises an inner rigid housing 50, a Self-Lubricating Elastomer (SLE™) sleeve 52 and an outer rigid cup-shaped housing 54. Inner housing 50 is a generally cylindrical housing defining an annular groove 56. Sleeve 52 is an annular sleeve disposed around inner housing 50 and it defines an annular rib 58 disposed within groove 56. Outer housing 54 is generally cup-shaped cylindrical housing disposed around sleeve 52 and inner housing 50.

Sleeve 52 extends below a lower surface 60 of inner housing 50 and below a fully open end of outer housing 54 defined by an outward radial flange 62 of outer housing 54. Inner housing 50 defines a central bore 64, sleeve 52 defines a central aperture 66 and outer housing 54 defines an aperture 68 at a closed end of outer housing 54. Bore 64 and apertures 66 and 68 accommodate a bolt 70 which secures pivot joint 20 to the appropriate suspension component. The portion of sleeve 52 which extends beyond lower surface 60 will be compressed to provide a seal for pivot joint 20. After bolt 70 is tightened, a plastic cap 72 is fit within aperture 68 to also provide a seal for pivot joint 20. Outer housing 54 is secured to the appropriate suspension component by being press fit within an aperture or by other means known in the art. In the preferred embodiment, bolt 70 is secured to knuckle 12 or 36 or to the appropriate control rod and outer housing 54 is secured to control arm 18, 32 or 34.

Inner member 50 is coated with a low friction material 80 such as, but not limited to, PTFE. Sleeve 52 is bonded, by means known in the art, to outer housing 54. The components can be designed to be self-captivating through mechanical interlock, if desired. In addition, the components, as is shown in FIG. 3, can be designed to be self-sealing against outside contaminants. The spring rate in both the radial and the axial direction can be controlled by the design for sleeve 52. Pivot joint 20, shown in FIG. 3, provides captivation, sealing and radial/axial tuning.

During operation, pivot joint 20 offers shock isolation due to the elastomeric properties of sleeve 52. Sleeve 52 is also free to rotate about inner housing 50 with minimal windup and therefore low torque. The low-torque rotation is accomplished through the sliding of sleeve 52 on low friction material 80 located on inner member 50 while the outer surface of sleeve 52 is bonded to outer housing 54.

While FIG. 3 illustrates one design for pivot 20, pivot 20 could utilize different shapes of inner housing 50, sleeve 52 and outer housing 54 to adjust package size, load capacity, captivation, spring rates and sealing properties based on application requirements. In addition, coatings or greases different than coating 80 could be used to reduce friction. Finally, other materials for sleeve 52 can be used as long as proper sliding can be achieved between sleeve 52 and inner housing 50.

Referring now to FIG. 4, a sway bar link 110 is illustrated having a pivot joint 120 in accordance with another embodiment of the present invention. Sway bar link 110 comprises a longitudinally extending link 112, an elastomeric joint 114 and pivot joint 120. Link 112 is a formed metal or composite member which defines a first bushing bore 116 and a second bushing bore 118.

Elastomeric joint 114 comprises an inner tubular member 112, an annular elastomeric member 124 and a cylindrical outer member 126. Inner tubular member 122 extends through cylindrical outer member 126 with annular elastomeric member 14 being disposed between them. Typically, annular elastomeric member 124 is bonded to both inner tubular member 122 and cylindrical outer member 126. Cylindrical outer member 126 is press fit or otherwise secure within first bushing bore 116. A bolt (not shown) similar to bolt 70 described above, extend through inner tubular member 122 to secure sway bar link 110 to the vehicle and/or the vehicle's suspension system.

Referring now to FIGS. 4 and 5, pivot joint 120 comprises an inner tubular member 132, an annular elastomeric member 134 and an outer generally cylindrical member 136. Inner tubular member 132 defines a through bore 138 and a generally spherical or contoured outer surface 140. Through bore 138 accommodates a bolt (not shown) similar to bolt 70 described above, to attach say bar link 110 to the vehicle and/or the vehicle's suspension system. The outer surface of inner tubular member 132 can be coated with a low friction material 80 as detailed above for inner member 50, if desired. Annular elastomeric member 134 defines a generally spherical or contoured inner surface 142 which mates with spherical or contoured outer surface 140 of inner tubular member 132. A generally cylindrical extension 144 extends from each end of elastomeric member 134 as shown in FIGS. 5 and 6. Inner tubular member 132 is designed to rotate and pivot within annular elastomeric member 134. This movement is facilitated by the materials used to manufacture these components or by the addition of a lubricant such as, but not limited to, low friction material 80. Annular elastomeric member 134 is disposed within and bonded to outer generally cylindrical member 136. While being described as being bonded to outer member 136, it is within the scope of the present invention to utilize the compression of annular elastomeric member 134 to create the necessary retention of annular elastomeric member 134 by outer generally cylindrical member 136. Outer generally cylindrical member 136 is press fit or otherwise secured within second bushing bore 118.

During operation, pivot joint 120 offers shock isolation due to the elastomeric properties of annular elastomeric member 134. Inner tubular member is free to rotate about annular elastomeric member 134 and outer generally cylindrical member 136 about a first axis 150 with minimal wind-up and therefore low torque. The low torque rotation is accomplished through the sliding of outer surface 140 on inner surface 142 with or without lubrication and/or low friction material 80 while the outer surface of annular member 134 is secured to outer member 136. In a similar manner, low torque pivoting is accomplished through the sliding of outer surface 140 on inner surface 142 with or without lubrication and/or low friction material 80 around a second axis 152 generally perpendicular to first axis 150. Circular extensions 144 of annular elastomeric member 134 cushion the interface between inner tubular member 132 and outer generally cylindrical member 136.

Pivot joint 120 can be a direct replacement for pivot joint 20 illustrated at various positions in FIGS. 1 and 2.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pivot joint comprising:
    an inner member having an outer surface and an end surface generally perpendicular to said outer surface;
    an elastomeric member disposed around said inner member, said outer surface and said end surface of said inner member being rotatable within said elastomeric member;
    a cup-shaped outer member disposed around said elastomeric member, said cup-shaped outer member defining an outer wall, a closed end and a fully open end, said elastomeric member being fixedly secured to said outer member, said outer wall being disposed opposite to said outer surface of said inner member and said closed end being disposed opposite to said end surface of said inner member; and
    a low friction member disposed between said inner member and said elastomeric member, said low friction member being separate from said elastomeric member.

2. The pivot joint described in claim 1 wherein said inner member rotates within said elastomeric member around an axis.

3. The pivot joint described in claim 2 further comprising an axial retention member disposed between said inner member and said elastomeric member.

4. The pivot joint described in claim 3 wherein said axial retention member comprises a groove formed in one of said inner member and said elastomeric member and a rib formed on the other of said inner member and said elastomeric member, said rib being disposed within said groove.

5. The pivot joint described in claim 1 wherein said low friction member coats said inner member.

6. The pivot joint described in claim 1 wherein said elastomeric member is bonded to said outer member.

* * * * *